A. CARLBORG & G. NYMAN.
SHAFT AND AXLE BEARING.
APPLICATION FILED JULY 20, 1915.
1,172,514.
Patented Feb. 22, 1916.
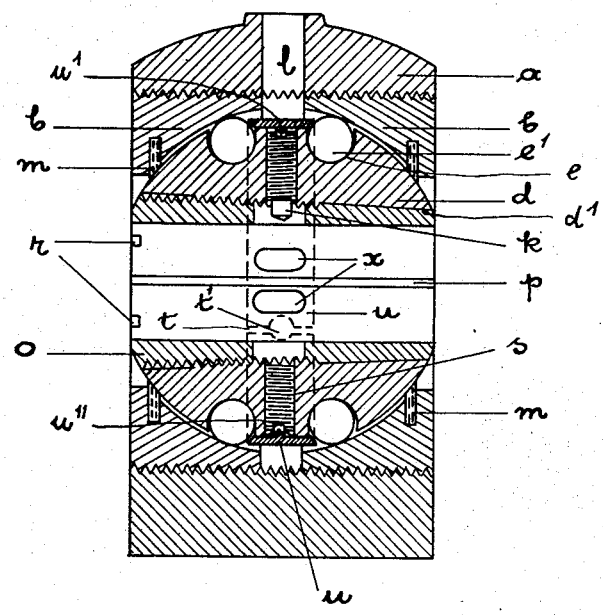
Inventors:
August Carlborg.
Gunnar Nyman.
by their Attorney:

UNITED STATES PATENT OFFICE.

AUGUST CARLBORG AND GUNNAR NYMAN, OF TYKÖ, FINLAND, RUSSIA.

SHAFT AND AXLE BEARING.

1,172,514.    Specification of Letters Patent.    Patented Feb. 22, 1916.

Application filed July 20, 1915. Serial No. 40,866.

*To all whom it may concern:*

Be it known that we, AUGUST CARLBORG and GUNNAR NYMAN, both residing at Tykö, in Finland, Russia, have invented certain new and useful Improvements in Shaft and Axle Bearings, of which the following is a specification.

Our invention relates to ball bearings for shafts and axles of the class wherein a spherical journal member is used, having channels or races therein for the balls.

The object of the invention is to provide improved means for retaining the balls in the races and fixing the journal member to the shaft.

The invention is illustrated in the accompanying drawing, which is a section of the bearing.

In the drawing $a$ designates the eye of the bearing, and $b$, $b$ are two shell members screwed into the said eye, having inner surfaces which form complementary segments of a sphere, for the balls to run on. The member $d$ has two channels $e$ for the balls $e^1$, and a coned bore $d^1$, which is in part screw threaded to engage with the externally coned and in part screw threaded shaft gripping sleeve $o$. The sleeve $o$ has a longitudinal slot $p$ and is springy, so that it can be compressed around the shaft to a greater or less degree by screwing it into the bore $d^1$. It has notches $r$ for a key whereby it is turned. Two flexible rings $m$ of felt, leather or the like fitted into the shell members $b$ make contact with the journal member $d$ and render the bearing dust-tight. The eye $a$ has a hole $l$, through which a steel pin or screw driver can be inserted into the space between the shell members $b$. The balls $e^1$ are retained in their races by means of a springy ring $u$, which is transversely split at the part $t$ of its circumference, so that it can be slipped on to the member $d$, to lie between the ball races, with its chamfered edges slightly overhanging the races, and retaining the balls therein. The ring $u$ has an internal rib $u^1$, and the member $d$ has a corresponding groove $u^{11}$, in which the rib lies when the ring is in position.

At the part on which the ring $u$ lies the member $d$ has a series of radial, tapped holes $s$. At the corresponding part of the sleeve $o$ there is a series of slots $x$, the slots being spaced unequal distances apart and so positioned in relation to the holes $s$ that when the sleeve is screwed into the bore $d^1$, and is turned for tightening its grip on the shaft, there is always one slot $x$ opposite one of the holes $s$, so that a screw $k$ screwed into that hole $s$ will enter the slot $x$ and prevent further rotation of the sleeve in the member $d$. At the part $t$ where the ring $u$ is split a circular aperture is formed, enabling the screw $k$ to be inserted through the hole $l$ into the member $d$.

In order to grip the journal to the shaft and insert the screw $k$, the following procedure may be adopted when the parts $d$ and $o$, with the balls $e$ and ring $u$, have been inclosed in the shell formed by the members $b$.

A pin or screw driver is inserted into the hole $l$, and the shaft, with the parts $o$, $d$ and $u$, is turned till the tool can enter the aperture $t^1$ and prevent further rotation of the ring $u$. Then the shaft is turned again, until one of the holes $s$ is under the aperture $t^1$, so that the driver can enter the member $d$ and prevent further rotation thereof. Then the sleeve $o$ is screwed into the member $d$, till it grips the shaft with adequate force, and the screw $k$ is inserted. The screw $k$ is turned so that its nick lies in line with the rib $u^1$, as shown in the drawing, and the ring $u$ is then given a slight rotation on the member $d$, so that the rib enters the nick and thus locks the screw.

What we claim as our invention and desire to secure by Letters Patent of the United States is:—

1. In a ball bearing the combination of a shell having a spherical inner surface, a spherical journal member in said shell, having in its circumference ball races, and a detachable ring embracing said journal member, partly over-hanging said ball races and adapted to retain balls therein.

2. In a ball bearing the combination of a shell having a spherical inner surface, a spherical journal member in said shell, having in its circumference ball races, and a detachable ring embracing said journal member, partly over-hanging said ball races and adapted to retain balls therein, said ring being transversely split and elastic.

3. In a ball bearing the combination of a shell having a spherical inner surface, a spherical journal member in said shell, having in its circumference ball races, and a groove between said races, and a detachable ring embracing said journal member, partly over-hanging said ball races, said ring having a rib engaging said groove.

4. In a ball bearing the combination of a shell having a spherical inner surface, a spherical journal member in said shell having external ball races and a coned screw-threaded bore, said journal member having also a series of tapped holes, an externally screw threaded and longitudinally split compressible shaft gripping sleeve screwed into said bore, having slots positioned to severally register with said tapped holes when the sleeve is screwed in the bore, and a detachable ring embracing said journal member, partly over-hanging said ball races and having a hole adapted to register with any of said tapped holes.

5. In a ball bearing the combination of a shell having a spherical inner surface, a spherical journal member in said shell having external ball races and a coned screw threaded bore, said journal member having also a series of tapped holes, an externally screw threaded and longitudinally split compressible shaft gripping sleeve screwed into said bore, having slots positioned to severally register with said tapped holes when the sleeve is screwed in the bore; and a detachable ring embracing said journal member, partly over-hanging said ball races and having a hole adapted to register with any of said tapped holes, said ring having also an internal rib whereby it is enabled to engage the nick of a screw inserted into any of said tapped holes.

In witness whereof we have signed this specification in the presence of two witnesses.

AUGUST CARLBORG.
GUNNAR NYMAN.